UNITED STATES PATENT OFFICE.

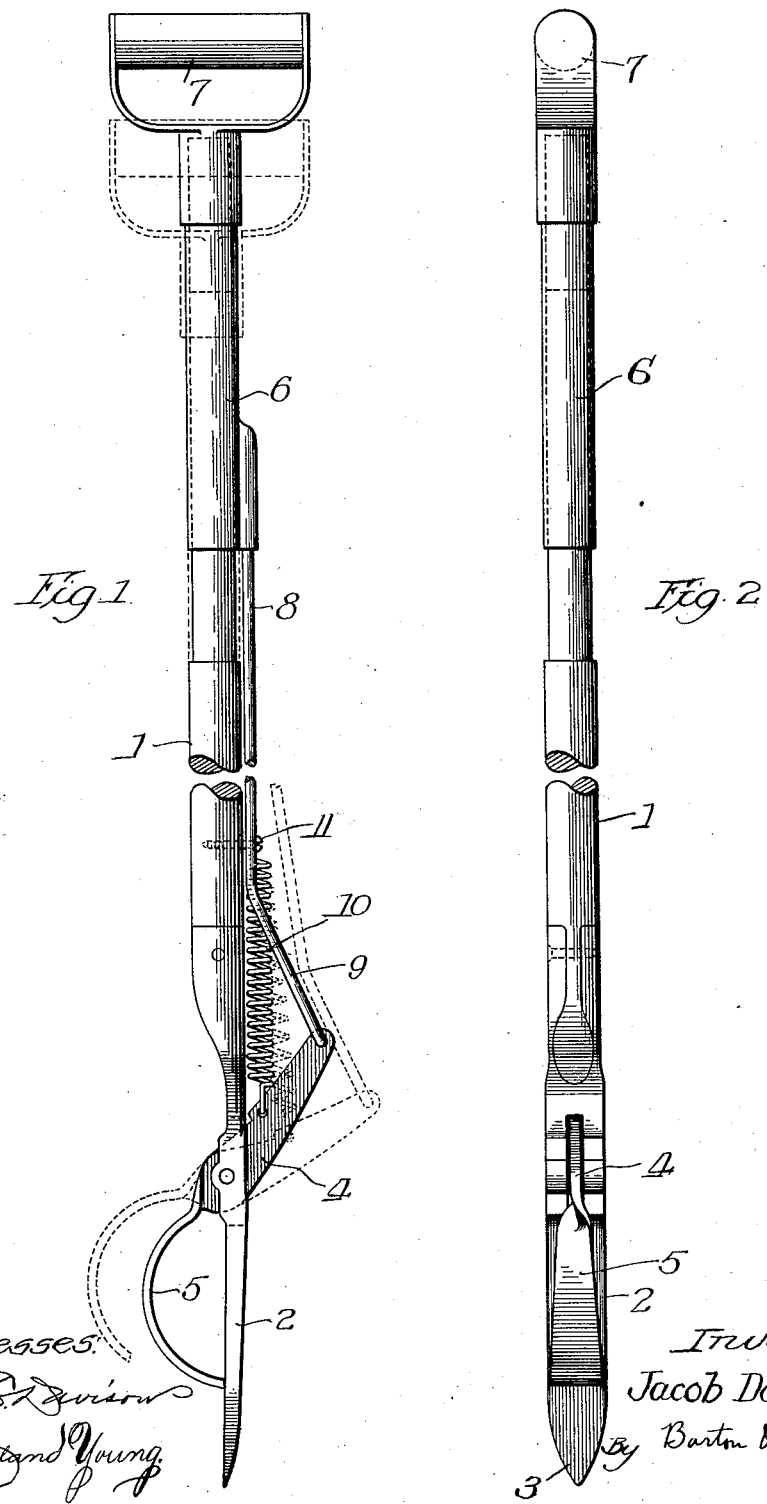

JACOB DAHL, OF COLUMBUS, OHIO, ASSIGNOR OF ONE-THIRD TO MARTIN DAHL AND ONE-THIRD TO RICHARD W. POELMA, BOTH OF CHICAGO, ILLINOIS.

WEED-PULLER.

1,024,500.  Specification of Letters Patent.  Patented Apr. 30, 1912.

Application filed August 18, 1911. Serial No. 644,844.

*To all whom it may concern:*

Be it known that I, JACOB DAHL, citizen of the United States, residing at Columbus, in the county of Franklin and State of Ohio, have invented a certain new and useful Improvement in Weed-Pullers, of which the following is a full, clear, concise, and exact description.

My invention relates to a weed-puller, and its object is to produce a device of simple construction which, by pushing on the handle of the device, will cause a blade to be inserted into the ground and will simultaneously open the grappling jaw preparatory to grasping the weed, and which when the handle is pulled will cause said grappling jaw to take hold of the weed and pulls the same out of the ground.

My invention comprises a staff having a blade upon the lower end thereof upon which is pivoted a grappling jaw, said staff having telescopically mounted upon its end a sleeve which carries a handle, a rod being used to operatively connect said sleeve and grappling jaw, whereby a downward thrust upon said sleeve opens said jaw and an upward pull thereon closes said jaw.

My invention may be more readily understood by reference to the accompanying drawings, in which—

Figure 1 is a side elevation of the device, the dotted lines indicating the positions assumed by the parts when the sleeve is telescoped on the staff; and Fig. 2 is a similar view at right angles to Fig. 1.

Similar figures of reference refer to similar parts throughout the drawings.

The staff 1 of wood or other suitable material terminates at its lower end in a metal blade 2 which is preferably provided with a pointed end 3 in order that it may be more readily inserted in the ground. The blade 2 is slotted near its upper end and a lever 4 extends through the slot, being pivoted to said blade. The lower end of the lever carries a grappling jaw 5. Telescopically mounted upon the upper end of the staff 1 is a metallic sleeve 6 provided at its upper end with a hand-hold or handle 7. A steel rod 8 is secured at its upper end to the sleeve 6 and is pivoted at its lower end to the upper end of the lever 4. The rod 8 throughout the greater portion of its length preferably lies in parallel relation to the staff 1 and is bent at its lower end 9 away from the staff 1 so as to connect with the lever 4 at some distance from the blade 2, and thereby to provide greater leverage for operating the grappling jaw 5. The sleeve 6 is normally spring-thrust into its non-telescoping position. For this purpose a coiled spring 10 is preferably employed, such spring being secured at its upper end by a screw 11 to the shaft 1 and at its lower end to the lever 4. The spring thus normally holds the grappling jaw 5 in its grappling engagement with the jaw 2.

In use the point 3 of the blade is placed on the ground at the root of the weed to be pulled. Downward pressure upon the handle 7 causes the sleeve 6 to telescope against the tension of the spring 10, thus exerting sufficient thrust on the blade 2 to cause the point of the blade to enter the ground. At the same time the grappling jaw 5 is thrown open, as indicated in dotted lines in Fig. 1, whereby the stalk of the weed can be placed between the jaw 5 and the blade 2. Upon the downward pressure being removed from the handle 7 the spring 10 causes the blade 5 to clamp the stalk against the blade 2. Thereupon an upward pull on the handle 7 pulls the weed thus grappled. The weed, as is obvious, can be released by a slight downward movement of the sleeve 6.

What I claim is:

1. A weed-puller comprising a staff terminating at its lower end in a blade, a lever pivoted to said blade and carrying a grappling jaw upon its lower end adapted to coöperate with said blade, a sleeve telescopically mounted upon the upper end of said staff, a handle carried upon the upper end of said sleeve, a rod pivoted to the upper end of said lever and operatively connecting said sleeve and said lever, and a spring normally holding said sleeve in its non-telescoping position; whereby a downward pressure upon said handle will effect a downward thrust of said blade and will simultaneously throw open said grappling jaw against the tension of said spring.

2. A weed-puller comprising a staff terminating at its lower end in a blade having a slot near its upper end, a lever extending through said slot and pivoted to said blade, said lever carrying a grappling jaw upon its lower end, a coil spring secured at its upper end to said staff and at its lower end to said lever above its pivotal point, a sleeve telescopically mounted upon the upper end of said staff, a handle carried upon the upper end of said sleeve, and a rod secured to said sleeve and pivoted at its lower end to the upper end of said lever.

In witness whereof, I hereunto subscribe my name this 22nd day of May, A. D., 1911.

JACOB DAHL.

Witnesses:
E. F. SUTER,
A. T. VING.

Copies of this patent may be obtained for five cents each, by addressing the "Commissioner of Patents. Washington, D. C."